US010025159B2

(12) United States Patent
Fujikata (10) Patent No.: US 10,025,159 B2
(45) Date of Patent: Jul. 17, 2018

(54) OUTPUT MONITORING METHOD FOR OPTICAL MODULATOR AND OUTPUT MONITORING DEVICE

(71) Applicant: NEC Corporation, Minato-ku, Tokyo (JP)

(72) Inventor: Junichi Fujikata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/665,114

(22) Filed: Mar. 23, 2015

(65) Prior Publication Data

US 2015/0277207 A1    Oct. 1, 2015

(30) Foreign Application Priority Data

Mar. 27, 2014 (JP) .................... 2014-067113

(51) Int. Cl.
*G02F 1/225* (2006.01)
*G02F 1/01* (2006.01)
*G02F 1/21* (2006.01)

(52) U.S. Cl.
CPC ............ *G02F 1/225* (2013.01); *G02F 1/0121* (2013.01); *G02F 1/0123* (2013.01); *G02F 2001/212* (2013.01); *G02F 2201/58* (2013.01)

(58) Field of Classification Search
CPC .. G02F 1/0121; G02F 2201/58; G02F 1/0123; G02F 2001/212; G02F 1/225
See application file for complete search history.

(56) References Cited

U.S. PATENT DOCUMENTS

| 6,334,004 | B1 | 12/2001 | Okuma et al. | |
| 6,469,817 | B1 | 10/2002 | Heflinger | |
| 7,327,911 | B2 * | 2/2008 | Piede | G02F 1/025 385/129 |
| 8,252,670 | B2 * | 8/2012 | Fedeli | G02B 6/1347 257/E21.334 |
| 8,532,440 | B2 * | 9/2013 | Ushida | G02F 1/025 385/131 |

(Continued)

FOREIGN PATENT DOCUMENTS

| JP | 05-053086 A | 3/1993 |
| JP | 2000-180804 A | 6/2000 |

(Continued)

OTHER PUBLICATIONS

Japanese Office Action for JP Application No. 2014-067113 dated Nov. 7, 2017 with English Translation.

*Primary Examiner* — John M Bedtelyon (57) ABSTRACT

An output monitoring method for an optical modulator includes: branching light into first and second lights; modulating a phase of the first light within a first waveguide; modulating a phase of the second light within a second waveguide; multiplexing the first and second lights to generate interference light, and outputting the interference light from first and second output ports; detecting a difference or ratio between a portion of the interference light from the first output port and a portion of the interference light from the second output port; and setting an operating point of light based on the detected difference or ratio; and controlling phase modulation of follow-on light that propagates through the first and second waveguides so as to keep the operating point constant.

9 Claims, 4 Drawing Sheets

(56) References Cited

U.S. PATENT DOCUMENTS

| | | |
|---|---|---|
| 2007/0292075 A1 | 12/2007 | Montgomery et al. |
| 2009/0003755 A1 | 1/2009 | Liu et al. |
| 2012/0257850 A1 | 10/2012 | Fujikata et al. |
| 2013/0161496 A1 | 6/2013 | Akiyama |

FOREIGN PATENT DOCUMENTS

| | | |
|---|---|---|
| JP | 2008-510174 A | 4/2008 |
| JP | 2009-540385 A | 11/2009 |
| JP | 2010-002775 A | 1/2010 |
| JP | 2013-130738 A | 7/2013 |
| WO | 2011/030593 A1 | 3/2011 |

* cited by examiner

OUTPUT MONITORING METHOD FOR OPTICAL MODULATOR AND OUTPUT MONITORING DEVICE

BACKGROUND OF THE INVENTION

Field of the Invention

The present invention relates to an output monitoring method for an optical modulator and an output monitoring device.

Description of Related Art

In various systems such as home-use optical fiber networks and local area networks, silicon-based optical communication devices are employed as devices that function at the optical fiber communication wavelengths of 1310 nm and 1550 nm. Silicon-based optical communication devices are highly promising devices that utilize complementary metal oxide semiconductor (CMOS) technology to enable integration of an optical function element and an electronic circuit on a silicon platform.

Passive devices such as waveguides, optical couplers and wavelength filters are being widely studied in recent years. Also, active devices such as silicon-based optical modulators and optical switches are important elements enabling operation of optical signals for such passive devices, and are attracting a great deal of attention. However, the response speed of the thermo-optical effect of silicon is controlled by the heat conduction. Therefore, optical phase modulation frequency of optical modulators and optical switches capable of changing the refractive index by the thermo-optic effect of silicon is 1 Mb/sec or lower. Therefore, in order to realize the high modulation frequency required by ever more optical communication systems, an electro-optical component such as an optical modulator and optical switch utilizing the electro-optical effect enabling high-speed operation is required.

No change due to the Pockels effect is observed in the refractive index of pure silicon, and a change in the refractive index of pure silicon due to the Franz-Keldysh effect or the Kerr effect is extremely small. Therefore, many electro-optical elements presently proposed use a carrier plasma effect. That is, to change the phase or the intensity of light propagating in a silicon layer, the real and imaginary parts of the refractive index are changed by changing the free carrier density in the silicon layer.

In an optical modulator using this kind of free carrier absorption, the intensity of output light is directly modulated by changes in absorption of light propagating through silicon. In structures using changes in refractive index, a Mach-Zehnder-interferometer-type optical modulator is ordinarily used. In the Mach-Zehnder-interferometer-type optical modulator serving as a waveguide, a phase difference is imparted to one or both light waves propagating through two waveguides (arms) by a change in the refractive index, and by causing interference between these lights, an optical intensity modulation signal is obtained.

Since the waveguide constituting the Mach-Zehnder-interferometer-type optical modulator is constituted with a semiconductor such as silicon, the phase difference of lights propagating through each waveguide (arm) increases in a non-linear manner with respect to increases in the input voltage, and the inclination becomes so steep that the input voltage becomes high. Due to such a non-linear phase difference characteristic with respect to the input voltage, the problem arises of the amplitude (intensity) of the optical signal output from the optical modulator shifting from the predetermined value. Also, there is the problem of the phase difference of light propagating through a waveguide changing due to the influence of surrounding temperature conditions and the interferometer itself degrading over time.

Generally, an optical modulator is required to output an optical signal with a stable amplitude and phase angle. For that reason, it is always necessary to keep the extinction characteristic (modulation characteristic) of light output from the optical modulator constant. In response to the aforementioned issues, Published Japanese Translation of No. 2008-510174 of the PCT International Publication (hereinafter Patent Document 1) discloses an automatic bias controller including a means that monitors the extinction curve of light to be output and controls the operating point of a device (the value between the maximum value of light intensity and minimum value of light intensity). The automatic bias controller of Patent Document 1 enables feedback to the bias condition for the modulator so that the operating point of the device does not shift, based on the extinction characteristic of light that has undergone interference at the output side.

On the other hand, in the case of causing light waves that have propagated through two waveguides to undergo interference prior to performing monitoring of the light to be output, when both are in opposite phases destructive interference results, and the intensity to be output falls. It has been confirmed that the reduced portion of light is emitted within the substrate (see Japanese Unexamined Patent Application, First Publication No. H05-53086, which is hereinafter referred to as Patent Document 2).

In the automatic bias controller disclosed in Patent Document 1, the intensity of light that is output is detected by a photodetector that is single-end connected. In this case, due to variations in the ground potential and the influence of noise due to the external environment, it is difficult to monitor the extinction characteristic of light to be output with a high accuracy.

Emitted light that is confirmed in Patent Document 2 exerts an adverse effect on other elements and circuits as noise. For the operation of an optical modulator, it is necessary to inhibit the generation of noise that is caused by such radiation light.

SUMMARY OF THE INVENTION

An exemplary object of the present invention is to provide an output monitoring method for an optical modulator that resolves the aforementioned issues.

An output monitoring method according to an exemplary aspect of the present invention is for a Mach-Zehnder-interferometer-type optical modulator including first and second waveguides. The output monitoring method includes: branching light from a light source at a branching portion into first and second lights; inputting the first light into a first end of the first waveguide, modulating a phase of the first light within the first waveguide, and then outputting the first light from a second end of the first waveguide; inputting the second light into a first end of the second waveguide, modulating a phase of the second light within the second waveguide, and then outputting the second light from a second end of the second waveguide; multiplexing at an optical coupler the first and second lights the phases of which have been modulated to generate interference light, and outputting the interference light from first and second output ports of the optical coupler; detecting at a detector a difference or ratio between a portion of the interference light from the first output port and a portion of the interference light from the second output port; and setting an operating point of light based on the detected difference or ratio; and controlling phase modulation of follow-on light that propagates through the first and second waveguides so as to keep the operating point constant.

An output monitoring device according to an exemplary aspect of the present invention includes: a light source that emits light; a branching portion that branches the light from the light source into first and second lights; a Mach-Zehnder-interferometer-type optical modulator that includes first and second waveguides, the first waveguide receiving the first light at a first end of the first waveguide, the first waveguide modulating a phase of the first light within the first waveguide, the first waveguide outputting the first light from a second end of the first waveguide, the second waveguide receiving the second light at a first end of the second waveguide, the second waveguide modulating a phase of the second light within the second waveguide, the second waveguide outputting the second light from a second end of the second waveguide; an optical coupler that multiplexes the first and second lights the phases of which have been modulated to generate interference light, and outputs the interference light from first and second output ports of the optical coupler; a detector that detects at a difference or ratio between a portion of the interference light from the first output port and a portion of the interference light from the second output port.

A method for monitoring an optical modulator according to one exemplary embodiment of the present invention enables monitoring of the extinction characteristic of light output in a Mach-Zehnder-interferometer-type optical modulator at a high accuracy without generating noise.

DETAILED DESCRIPTION OF THE INVENTION

Hereinbelow, exemplary embodiments of the present invention shall be described with reference to the appended drawings. Note that in the following description, the same reference symbols shall be given to constitutions having the same function, with descriptions thereof being omitted. Also, for the purpose of illustration, some portions may be shown enlarged, with the dimensional ratios and the like of each constituent element not necessarily being the same as reality.

First Exemplary Embodiment

Figure 1:
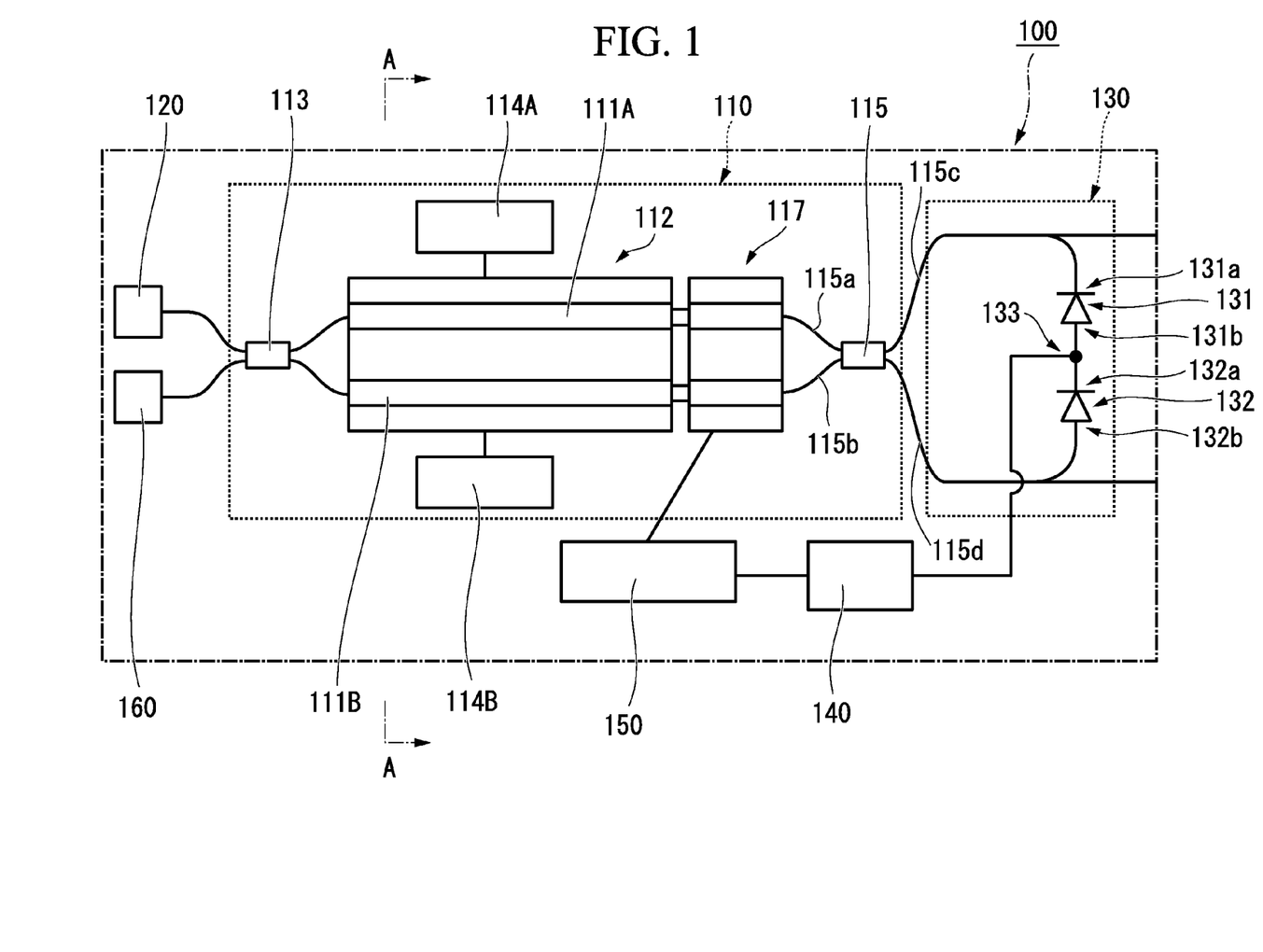
FIG. 1 is a configuration diagram of an output monitoring device for an optical modulator according to the first exemplary embodiment of the present invention.

An output monitoring device including an optical modulator according to a first exemplary embodiment of the present invention shall be described with reference to FIG. 1. FIG. 1 is a diagram that schematically shows the constitution of an output monitoring device 100. The output monitoring device 100 includes a Mach-Zehnder-interferometer-type optical modulator 110, a light source 120, a detecting unit (detector) 130, a memory unit 140, a feedback unit 150, and a test light source 160.

The optical modulator 110 includes an optical modulation portion (electro-optical element) 112, an optical branching portion 113, a drive portion 114A, a drive portion 114B, and an optical coupling portion (optical coupler, multiplexing portion) 115. The optical modulation portion 112 includes two waveguides (arms) 111A and 111B constituted by silicon. The optical branching portion 113 branches input light into the two waveguides 111A and 111B. The drive portion 114A applies a drive voltage for optical modulation to the waveguide 111A. The drive portion 114B applies a drive voltage for optical modulation to the waveguide 111B. The optical coupling portion 115 couples the optical outputs from the waveguides 111A and 111B. The drive portions 114A and 114B constitute a differential RF (radio frequency) drive circuit. Thereby, it is possible to perform two-fold phase modulation compared to the case of using a single-ended drive circuit, and it is possible to prevent the effects of external noise.

Moreover, in the optical modulator 110, a test port that allows the input of the light of a known mode is connected to the input side (first end) of the two waveguides 111A and 111B via the optical branching portion 113. The test port receives the light of the known mode from test light source 160. The optical modulator 110 further includes a phase regulator 117 for DC balance control and dispersion correction. The phase regulator 117 is installed between the output side (second end) of the two waveguides 111A and 111B and the optical coupling portion 115, and corrects the optical coupling rate in the optical coupling portion 115.

The drive portions 114A and 114B apply a drive voltage to the respective waveguides 111A and 111B to modulate the phase of light propagating in each waveguide 111A and 111B. The drive voltage to be impressed differs according to the structure of the waveguides 111A and 111B. Typically, in the case of having an SiGe bipolar transistor structure, the drive voltage is preferably 1.5 V. In the case of having a CMOS transistor structure, the drive voltage is preferably 1.0 V or less.

As the waveguides 111A and 111B constituted from silicon, the phase modulation of light preferably increases in a linear and gradual manner with respect to the drive voltage that is applied. If the phase modulation amount is small with respect to the drive voltage, it is possible to perform fine control. Also, since the drive voltage and the phase modulation amount have a one-to-one correspondence if the phase modulation has linearity with respect to the drive voltage, the controllability is high, and it is possible to avoid complication of the elements. Note that in the case of the phase modulation increasing in a non-linear and gradual manner with respect to the drive voltage, since the shift in the operating point (the value midway between the maximum value of the optical intensity and the minimum value of the optical intensity) becomes large, it is not preferred.

As a waveguide in which the phase modulation increases in a linear and gradual manner with respect to the drive voltage, a semiconductor-insulator-semiconductor (SIS) junction type structure is preferred. Hereinbelow, an explanation shall be given using as an example the case of the optical modulating portion 112 being a silicon-based electro-optical element including SIS junction waveguides.

Figure 2:
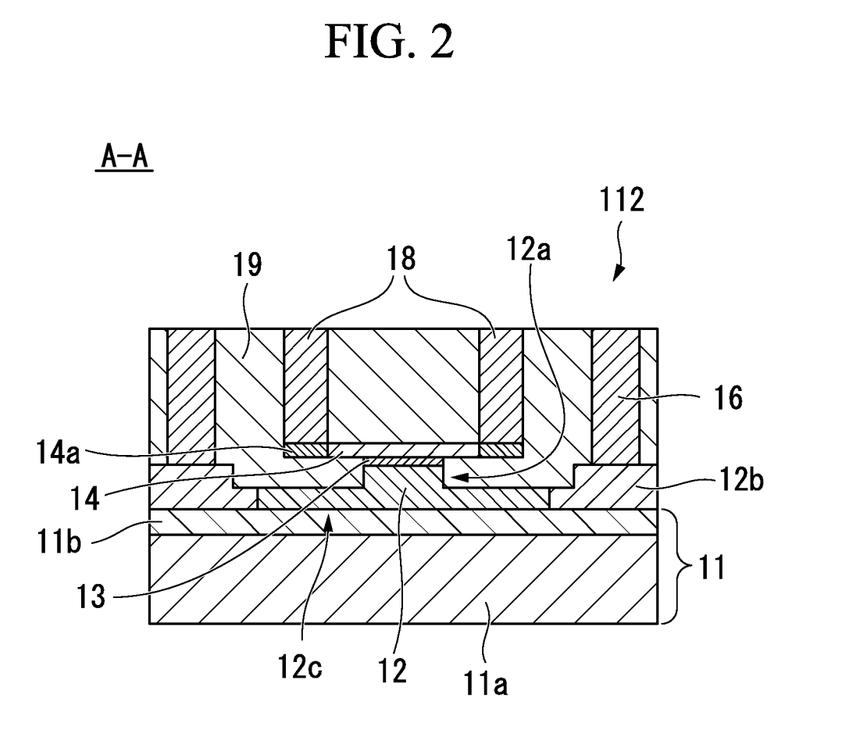
FIG. 2 is a cross-sectional view taken along line A-A shown in FIG. 1.

FIG. 2 is a diagram that schematically shows the cross-sectional constitution of the optical modulating portion 112 taken along line A-A in FIG. 1. The optical modulating portion 112 has a first-conduction-type semiconductor layer (silicon layer) 12, a dielectric layer 13, and a second-conduction-type semiconductor layer (silicon layer) 14. The first-conduction-type semiconductor layer 12 is provided on an SOI substrate 11, and has a ribbed waveguide structure 12a that projects in a rectangular shape to the side opposite the SOI substrate 11. The dielectric layer 13 is laminated on the ribbed waveguide structure 12a. The second-conduction-type semiconductor layer 14 is laminated on the dielectric layer 13. Here, a substrate that is constituted by a support substrate 11a made of silicon and a silicon oxide film 11b formed on the laminating side thereof is called the SOI (Silicon on Insulator) substrate 11.

The first-conduction-type semiconductor layer 12 is connected to a first electrode wiring 16 via a first contact portion 12b in which a first-conduction-type impurity is doped at a higher concentration than the other portions of the semiconductor layer 12. The second-conduction-type semiconductor layer 14 is connected to a second electrode wiring 18 via a second contact portion 14a in which a second-conduction-type impurity is doped at a higher concentration than the other portions of the semiconductor layer 14.

The first contract portion 12b projects with respect to the first-conduction-type semiconductor layer 12. Also, the optical modulating portion 112 further includes a cladding layer 19 that is made of an oxide and covers the semiconductor layers 12 and 14 as well as the dielectric layer 13. In the cladding layer 19, the propagation of light is limited. Note the first exemplary embodiment shows an example of using a SOI substrate as a support substrate that constitutes the optical modulating portion 112, but any substrate may be used provided it has a silicon base.

The optical modulating portion 112 employs the electro-optical effect (free carrier plasma effect). Hereinbelow, using the case in which the semiconductor layer is comprised by silicon as an example, the operation principle of the optical modulating portion 112, that is, the mechanism of optical phase modulation in silicon, shall be described.

As stated above, since the pure electro-optical effect is not obtainable in silicon or difficult to obtain, it is possible to utilize only the free carrier plasma effect and the thermo-optical effect for the optical modulation operation. Moreover, in order to attain high-speed operation (Gb/s or higher) which is an exemplary object of the first exemplary embodiment of the present invention, it is possible to describe only the free carrier plasma effect being valid using the following Equations (1) and (2) below.

$$\Delta n = -\frac{e^2\lambda^2}{8\pi^3 c^3 \varepsilon_0 n}\left(\frac{\Delta N_e}{m_e} + \frac{\Delta N_h}{m_h}\right) \quad (1)$$

$$\Delta k = -\frac{e^3\lambda^2}{8\pi^3 c^3 \varepsilon_0 n}\left(\frac{\Delta N_e}{m_e^2 \mu_e} + \frac{\Delta N_h}{m_h^2 \mu_h}\right) \quad (2)$$

"$\Delta n$" of Equation (1) and "$\Delta k$" of Equation (2) respectively represent the real part and the imaginary part of the refractive index of a silicon layer. In the expressions, "e" represents charge. "$\lambda$" represents the wavelength of light. "$\varepsilon_0$" represents the dielectric constant in a vacuum. "n" represents the refractive index of a silicon layer. "$m_e$" represents the effective mass of electron carriers. "$m_h$" represents the effective mass of hole carriers. "$\mu_e$" represents the mobility of electron carriers. "$\mu_h$" represents the mobility of hole carriers. "$\Delta N_e$" represents the concentration change of electron carriers. "$\Delta N_h$" represents the concentration change of hole carriers.

An experimental evaluation relating to the electro-optical effect of a silicon layer was performed, and it was found that changes in the refractive index with respect to the carrier density at the optical communication wavelengths of 1310 nm and 1550 nm well match with the Drude formula. Also, in an electro-optical element that utilizes this effect, the amount of phase change $\Delta\theta$ is defined by the following Equation (3).

$$\Delta\theta = \frac{2\pi}{\lambda}\Delta n_{eff} L \quad (3)$$

"L" of Equation (3) represents the length of the active layer (effective modulation region) along the direction of light propagation in the waveguides 111A and 111B. "$\Delta n_{eff}$" represents the change in the effective refractive index that can be obtained from $\Delta n$ and $\Delta k$. As is evident from Equation (3), if the change in the effective refractive index $\Delta n_{eff}$ is large, even if the active length L is short, it is possible to produce a large phase change.

As described above, the optical modulating portion 112 of the SIS junction optical modulating portion 112 has the ribbed waveguide structure (which is also referred to as ribbed waveguide) 12a. For that reason, the optical waveguide portion and the region in which the refractive index changes overlap with each other, and the optical modulation efficiency with respect to the drive voltage of the SIS junction optical modulating portion 112 increases. That is, it is possible to shorten the length of the optical modulation active layer, and so it is possible to reduce the dimensions of the optical modulating portion 112. Note that the rib structure here means a structure that projects in the direction opposite the substrate 11.

The optical waveguide portion here means a portion of the semiconductor that guides light. Specifically, the first-conduction-type semiconductor layer 12 (mainly the ribbed waveguide 12a), the dielectric layer 13, and the second-conduction-type semiconductor layer 14 that constitute the SIS junction optical modulating portion 112 correspond to the optical waveguide portion. The region in which the refractive index changes is a region in which the carrier density changes. The region in which the refractive index changes means the region in the vicinity of the junction interface with the dielectric layer 13 among the first-conduction-type semiconductor layer 12 and the second-conduction-type semiconductor layer 14.

Also, by employing the ribbed waveguide (rib structure) 12a, it is possible to reduce the overlap between the region that is doped at a high concentration and the optical field. Here, the regions that are doped at a higher concentration are the first contact portion 12b and the second contact portion 14a of FIG. 2, and when light propagates through these regions, optical absorption due to the dopant occurs. By employing a rib structure in the waveguide, it is possible to reduce the loss due to the optical absorption in the regions that are doped at a high concentration.

Here, the thickness of the region in which the carrier density changes (maximum depletion layer thickness) W in thermal equilibrium is given by the following Equation (4).

$$W = 2\sqrt{\frac{\varepsilon_s kT \cdot \ln(N_c/n_i)}{e^2 N_c}} \quad (4)$$

In this expression, "$\varepsilon_s$" represents the dielectric constant of the semiconductor layer. "k" represents the Boltzmann constant. "$N_c$" represents the carrier density. "$n_i$" represents the intrinsic carrier concentration. "e" represents the amount of electric charge. For example, when $N_c$ is about $10^{17}$ cm$^{-3}$, the maximum depletion layer thickness W is about 0.1 μm. With an increase in carrier density, the maximum depletion layer thickness W, i.e., the thickness of the region in which modulation of the carrier density is caused, is reduced.

For that reason, it is preferable that the height of the ribbed waveguide 12a from the substrate be equal to or more than the maximum depletion layer thickness W. If the height of the ribbed waveguide 12a is the maximum depletion layer thickness W or greater, it is possible to make the region in which the carrier density modulates be within the ribbed waveguide 12a, and so it is possible to maintain to a high degree the overlap with the optical waveguide portion.

The first-conduction-type semiconductor layer 12 is connected to the first electrode wiring 16 at the first contact portion 12b in which a first-conduction-type impurity is doped at a higher concentration than the other portions of the semiconductor layer 12. Similarly, the second-conduction-type semiconductor layer 14 is connected to the second electrode wiring 18 at the second contact portion 14b in which a second-conduction-type impurity is doped at a higher concentration than the other portions of the semiconductor layer 14. By performing high-concentration doping, it is possible to reduce the contact resistance at the interface between the semiconductor layer 12 and the first electrode wiring 16 and the interface between the semiconductor layer 14 and the second electrode wiring 18. As a result, since the series resistance component is reduced, and hence the RC time constant decreases, it is possible to improve the speed of the optical modulation operation.

Moreover, the first contact portion 12b has a shape that projects with respect to the first-conduction-type semiconductor layer 12. For that reason, it is possible to further raise the doping density in the first contact portion 12b, and it is possible to further reduce the contact resistance of the interface between the semiconductor and conductor. That is to say, the RC time constant is small, and the speed of the optical modulation operation can further increase.

The semiconductor layer 12 further includes a slab portion 12c. The slab portion 12c is a non-projecting portion of the semiconductor layer 12, and is a portion of the semiconductor layer 12 excluding the ribbed waveguide (rib structure) 12a and the first contact portion (rib structure) 12b.

By forming the rib structure by causing the first contact portion 12b to project out, it is possible to shorten the width of the slab portion 12c. In order to reduce the overlap between the high-concentration-doped region and the optical waveguide portion, it is necessary to make the slab portion 12c as thin as approximately 0.1 μm. However, it is difficult to form the slab portion 12c uniformly thin over a wide area.

Therefore, by causing the first contact portion 12b to project out to provide a portion having sufficient thickness (that is, a rib structure), it is possible to narrow the region forming the slab portion 12c. Thereby, it is possible to mitigate the difficulty when forming the slab portion 12c, and as a result, it is possible to readily fabricate the optical modulation portion 112 having a SIS junction-type waveguide.

Each of the first-conduction-type semiconductor layer 12 and the second-conduction-type semiconductor layer 14 preferably is comprised by at least one layer that is selected from a group including polycrystalline silicon, amorphous silicon, strained silicon, monocrystalline, and $Si_{1-x}Ge_x$.

(Method for Manufacturing Optical Modulation Portion)

Figure 3A:
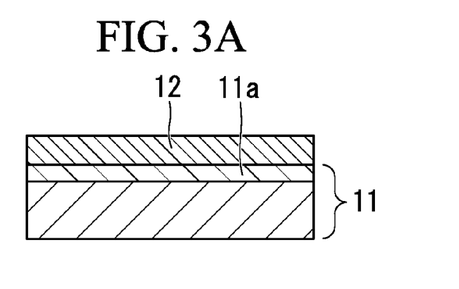
FIG. 3A is a cross-sectional view for describing a manufacturing step of the optical modulator according to the first exemplary embodiment of the present invention.

A method for manufacturing the optical modulation portion 112 shown in FIG. 2 shall be described with reference to FIG. 3A to 3G. First, as shown in FIG. 3A, the SOI substrate 11 is prepared in which a buried oxide film 11a with a thickness of 100 to 1000 nm is formed therein. In the SOI substrate 11, at least the portion on the side near the lamination surface from the embedded oxide film 11a has a conduction type of either p-type or n-type.

In the SOI substrate 11, impurity doping (ion injection) on the side near the lamination surface of the semiconductor layer (SOI layer) 12 with boron, phosphorous or arsenic may be performed prior to manufacturing the SOI substrate 11, or afterward.

Figure 3B:
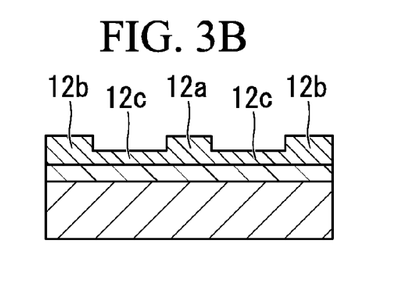
FIG. 3B is a cross-sectional view for describing a manufacturing step of the optical modulator according to the first exemplary embodiment of the present invention.

Next, as shown in FIG. 3B, the portion between the ribbed waveguide 12a and the first contact portion 12b is selectively etched using photolithography, whereby the slab portion 12c is formed. Thereby, the portions corresponding to the ribbed waveguide structure 12a and the first contact portion 12b become a projected shape with respect to the other portions of the semiconductor layer.

The etching performed here may be either wet etching or dry etching. However, it is necessary to adjust the etching condition so that the portions corresponding to the slab portions 12c are not completely removed. Adjustment of the etching condition can be performed by changing the temperature and the like. The thickness of the slab portion 12c is preferably 50 nm to 150 nm.

Figure 3C:
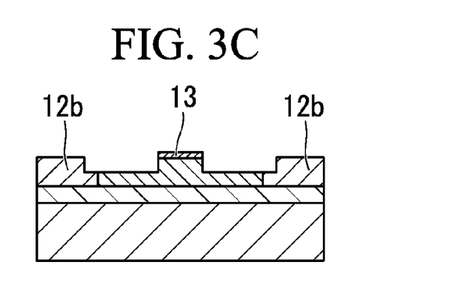
FIG. 3C is a cross-sectional view for describing a manufacturing step of the optical modulator according to the first exemplary embodiment of the present invention.

Next, as shown in FIG. 3C, the portion corresponding to the first contact portion 12b is doped with a first-conduction-type impurity by ion implantation to form the first contact portion 12b. Thereby, the first contact portion 12b is doped to a higher concentration with the first-conduction-type impurity than the other portions of the semiconductor layer 12. Next, the dielectric layer 13 is laminated on the ribbed waveguide structure 12a that projects in a rectangular shape.

Figure 3D:
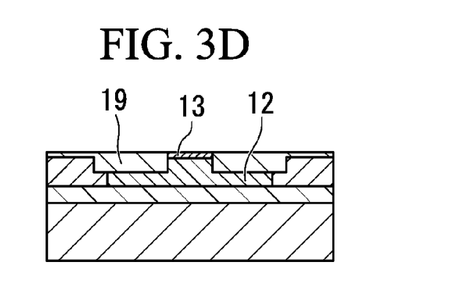
FIG. 3D is a cross-sectional view for describing a manufacturing step of the optical modulator according to the first exemplary embodiment of the present invention.

Next, an oxide film cladding layer 19 is once formed by a film formation method such as plasma CVD so as to cover the semiconductor layer 12 and the dielectric layer 13. As shown in FIG. 3D, the projected portions of the oxide film cladding layer 19 are removed by CMP and flattened in a manner following the shapes of the semiconductor layer 12 and the dielectric layer 13 positioned at the underlying layer.

Figure 3E:
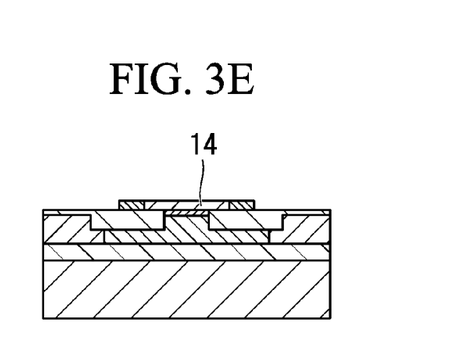
FIG. 3E is a cross-sectional view for describing a manufacturing step of the optical modulator according to the first exemplary embodiment of the present invention.

Next, as shown in FIG. 3E, a polycrystalline semiconductor layer is laminated to a thickness of 0.1 μm to 0.3 μm, and by ion implantation of a second-conduction-type impurity, the second-conduction-type semiconductor layer 14 is formed. The impurity implantation may be performed during film formation. Moreover, the ion implantation of the second-conduction-type impurity is performed at both ends of the second-conduction-type semiconductor layer 14, to form the second contact portions 14a in which the impurity is doped to a higher concentration than the other portions of the semiconductor layer 14.

Figure 3F:
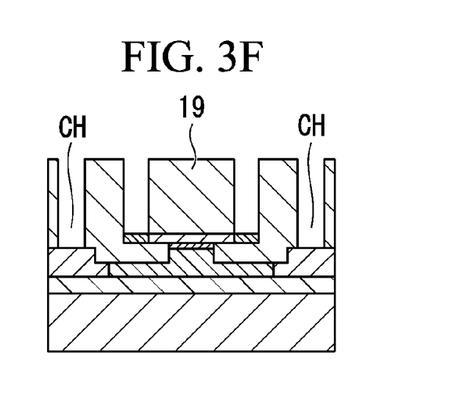
FIG. 3F is a cross-sectional view for describing a manufacturing step of the optical modulator according to the first exemplary embodiment of the present invention.
Figure 3G:
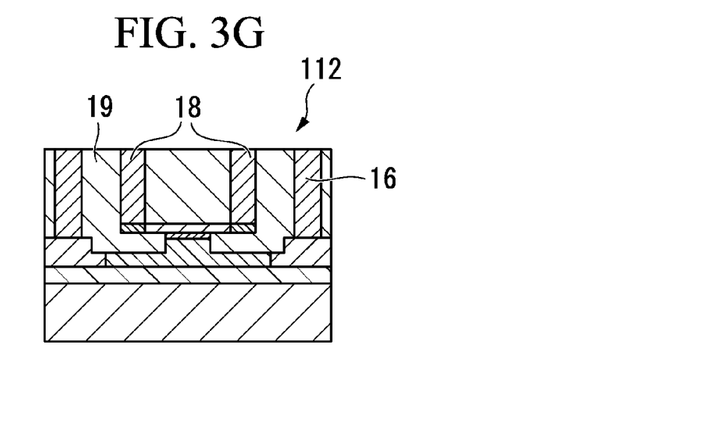
FIG. 3G is a cross-sectional view for describing a manufacturing step of the optical modulator according to the first exemplary embodiment of the present invention.

Next, as shown in FIG. 3F, an oxide film cladding layer 19 is again laminated by plasma CVD or the like, and then contact holes CH are formed therein by reactive etching. Then, as shown in FIG. 3G, a metal layer such as Ti/TiN/Al(Cu) or Ti/TiN/W is formed so as to fill in each of the contact holes CH by sputtering or CVD, and patterning by reactive etching is performed on the metal layer extending to the outside of the contact holes CH to form the electrode wiring 16 and 18.

By the above process, it is possible to obtain the optical modulation portion 112 according to the first exemplary embodiment of the present invention. By forming the electrode wiring 16 and 18, electrical contact with the drive circuit becomes possible.

(Output Monitoring Method)

Using the output monitoring device 100 shown in FIG. 1, a method of monitoring the output of the optical modulator 110 shall be described.

First, light from the light source 120 such as a laser diode is split in two directions at the optical branching portion 113, and then respectively guided to the different waveguides 111A and 111B to be propagated through the interior thereof. As the optical branching portion 113, a multi-mode interference (MMI) coupler may be used.

A modulation voltage is applied to one or both of the waveguides 111A and 111B to modulate the phase of the light propagating in the waveguides 111A and 111B. The application of the modulation voltage is specifically performed between the first electrode wiring 16 and the second electrode wiring 18 of the electro-optical element that includes the waveguides 111A and 111B. As a result of application of the modulation voltage, a relative phase difference is produced between the lights propagating through the waveguides 111A and 111B.

The two lights with differing phases that have passed through the waveguides 111A and 111B in this way converge at the optical coupling portion (phase interferometer) 115, where phase interference is caused. Similarly to the optical branching portion 113, a multi-mode interference coupler may be used as the optical coupling portion 115.

The optical coupling portion 115 is provided with two input ports 115a and 115b and two output ports 115c and 115d. The light that is output from the waveguide 111A is input to the one input port 115a, and the light that is output from the waveguide 111B is input to the other input port 115b. In the case of the two lights input to the optical coupling portion 115 having the same phase, they interfere so as to mutually intensify, with lights of equivalent intensity being output at the output ports 115c and 115d.

In the case of the two light input to the optical coupling portion 115 having opposite phases, they interfere so as to mutually weaken, and be output from either one of the two output ports 115c and 115d.

That is, by using a multi-mode interference coupler as the optical coupling portion 115, even in the case of the two lights that have passed through the waveguides 111A and 111B having mutually opposite phases, no light is radiated within the substrate or to the outside due to interference. Accordingly, during operation of the optical modulator 110, it is possible to inhibit the generation of noise that exerts adverse effects on other elements and circuits.

A portion of the interference light that is taken out at an arbitrary ratio using a directional coupler (not illustrated) from the output ports 115c and 115d of the optical coupling portion 115 is detected at the detecting unit 130. As the detecting unit 130, it is possible to use a device constituted from two photodiodes 131 and 132, that is, a differential photodiode. As the photodiodes 131 and 132, it is possible to use a device in which for example an $Si_xGe_{1-x}$ layer or InGaAs layer is laminated on an Si substrate. Also, as the photodiodes 131 and 132, for example, it is possible to use for example monolithic integrations epitaxially grown on Si substrates and bonded together as a heterogeneous substrate.

In this case, the two photo diodes 131 and 132 are electrically connected in series so as to connect the two output ports 115c and 115d extending from the optical coupling portion 115. That is, the cathode 131a of the photodiode 131 is connected to the output port (one output port) 115c of the optical coupling portion 115, and the anode 132b of the photodiode 132 is connected to the output port (the other output port) 115d. The anode 131b of the photodiode 131 and the cathode 132a of the photodiode 132 are electrically connected to each other.

As a result of the two photodiodes 131 and 132 being connected in this way, when light that is output from the optical modulator 110 is received at the detecting unit 130, it is possible to produce mutually reverse bias voltages at the cathode 131a of the photodiode 131 and the anode 132b of the photodiode 132.

Accordingly, it is possible to have the frequency characteristic and light reception sensitivity agree in the two photodiodes 131 and 132, and an excellent differential output waveform is obtained. As a result, since the effects of the in-phase noise component when integrated with another optical active device such as a modulator, and noise generation due to variations in ground potential, cables, or the external environment are reduced, high integration becomes possible.

The detecting unit 130 detects (monitors) the difference between the partial light outputs taken out at an arbitrary proportion from the two output ports 115c and 115d of the optical coupling portion 115. Specifically, the detecting unit 130 detects as a differential the difference or ratio between the output of current in the photodiode 131 and the output of current in the photodiode 132. That is, the detecting unit 130 detects the current value in a wiring portion 133 between the anode 131b of the photodiode 131 and the cathode 132a of the photodiode 132.

This current value depends on the ratio between the proportion distributed to the output port 115c and the proportion distributed to the output port 115d among the intensity of light output from the optical coupling portion 115. For example, in the case of the proportion distributed to the output port 115c and the proportion distributed to the output port 115d being equivalent, that is, in the case of the light output from the output port 115c and the light output from the output port 115d being in phase, the current value is zero.

Next, after setting the detected current value as the operating point of light output from the optical modulator, information related to the set operating point is stored in the memory unit 140 of the drive circuit or the like.

Then, the phase modulation of follow-on light that propagates through the two waveguides 111A and 111B is controlled via the feedback unit 150 while performing correction using the phase regulator 117 for DC balance control and dispersion correction so as to keep the set operating point constant.

According to the output monitoring method of the first exemplary embodiment given above, since the detection in the detecting unit 130 is performed by a differential system, the effects of noise generation due to variations in ground potential, cables, and external environment are eliminated. For that reason, it is possible to monitor the extinction characteristic of light that is output with a high accuracy without the need to consider the effects of the addition of such noise generation.

Second Exemplary Embodiment

Figure 4:
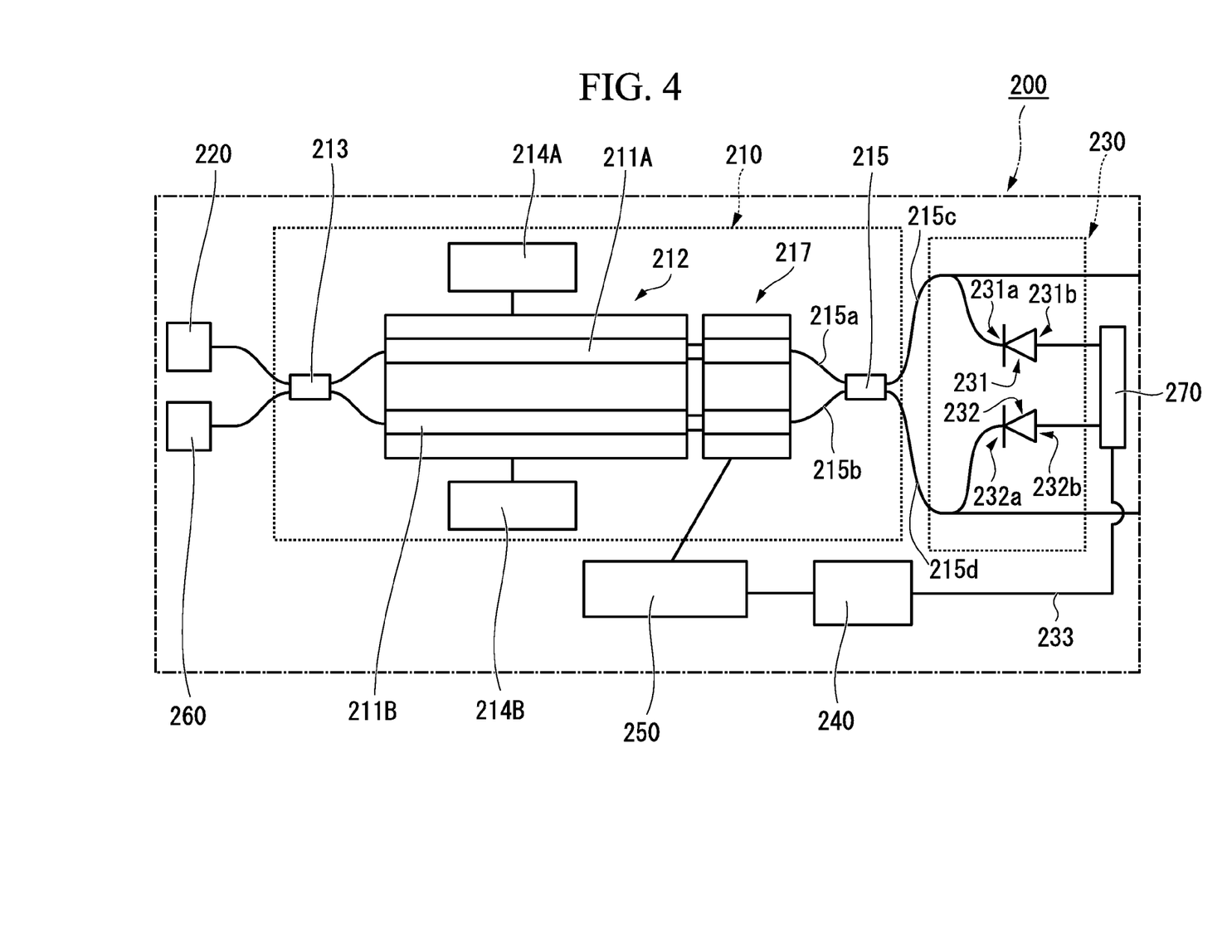
FIG. 4 is a configuration diagram of an output monitoring device for an optical modulator according to a second exemplary embodiment of the present invention.

An output monitoring device 200 including an optical modulator according to a second exemplary embodiment of the present invention shall be described with reference to FIG. 4. FIG. 4 is a diagram that schematically shows the constitution of an output monitoring device 200 including an optical modulator. The output monitoring device 200 includes a detecting unit (detector) 230 that is constituted by two photodiodes 231 and 232. As the photo diodes 231 and 232, it is possible to use device in which for example an $Si_xGe_{1-x}$ layer or InGaAs layer is laminated on an Si substrate. Also, as the photodiodes 231 and 232, for example, it is possible to use for example monolithic integrations epitaxially grown on Si substrates and bonded together as a heterogeneous substrate.

The output monitoring device 200 according to the second exemplary embodiment differs from the output monitoring device 100 according to the first exemplary embodiment in that the two photodiodes 231 and 232 are electrically connected in parallel between output ports 215c and 215d extending from an optical coupling portion 215. That is, among the two output ports 215c and 215d, the photodiode 231 is connected to the output port (one output port) 215c, and the photodiode 232 is connected to the output port (the other output port) 215d. The cathodes of the photodiodes 231 and 232 are electrically connected to each other, and the anodes of the photodiodes 231 and 232 are electrically connected each other. The constitutions of the output monitoring device 200 other than the detecting unit 230 are the same as those of the output monitoring device 100 according to the first exemplary embodiment. That is, an optical modulator 210, a light source 220, a memory unit 240, a feedback unit 250, and a test light source 260 shown in FIG. 4 respectively have the same function and configuration as the optical modulator 110, the light source 120, the memory unit 140, the feedback unit 150, and the test light source 160 shown in FIG. 1.

As a result of the two photodiodes 231 and 232 being connected in this way, a common voltage is produced at each of the cathodes 231a and 232a of the photodiodes 231 and 232 and at each of the anodes 231b and 232b of the photodiodes 231 and 232.

Accordingly, it is possible to have the frequency characteristic and light reception sensitivity agree in the two photodiodes 231 and 232, and an excellent differential output waveform is obtained. Furthermore, since the effects of the in-phase noise component when integrated with another optical active device such as a modulator, and noise generation due to variations in ground potential, cables or the external environment are reduced, high integration becomes possible.

The detecting unit 230 detects (monitors) the difference between partial optical outputs taken out at an arbitrary proportion using a directional coupler (not illustrated) from two output ports 215c and 215d of the optical coupling portion (optical coupler) 215. Specifically, the optical output power differential is taken out as an electrical signal using a TIA (trans-impedance amplifier) circuit 270.

Next, after setting the detected electrical signal (current value) as the operating point of light output from the optical modulator, information related to the set operating point is stored in the memory unit 240 of the drive circuit or the like.

Then, the phase modulation of follow-on light that propagates through the two waveguides 211A and 211B is controlled via the feedback unit 250 so as to keep the set operating point constant.

According to the output monitoring method of the second exemplary embodiment given above, since the detection in the detecting unit 230 is also performed by a differential system, the effects of noise generation due to variations in ground potential, cables, and external environment are eliminated. For that reason, it is possible to monitor the extinction characteristic of light that is output with a high accuracy without the need to consider the effects of the addition of such noise generation.

First Working Example

Hereinbelow, a first working example corresponding to the first exemplary embodiment shall be described, but working examples according to the present invention are not limited to the first working example.

In the output monitoring device 100 shown in FIG. 1, the input light was branched by the optical branching portion (optical branching structure) 113 arranged at the input side so as to have equivalent power in the waveguides 111A and 111B. Here, applying a plus voltage to the waveguide 111A caused a carrier to be accumulated at both sides of the thin dielectric layer 13, and applying a minus voltage to the waveguide 111B removed a carrier from both sides of the thin dielectric layer 13.

Thereby, in the carrier accumulation mode, the refractive index that the optical signal field sensed in the optical modulator 110 decreased, and in the carrier removal (depletion) mode, the refractive index that the optical signal field sensed increased, and as a result, the phase difference of the optical signals in the waveguides 111A and 111B became a maximum.

Next, the optical coupling portion (optical coupling structure) 115 provided on the output side multiplexed the optical signals propagating through the waveguides 111A and 111B. Then, the operating point of light in the Mach-Zehnder-interferometer-type optical modulator 110 was controlled through the aforementioned detecting unit 130, the memory unit 140, and the feedback unit 150. Thereby, it was confirmed that transmission of optical signals is possible at a rate of at least 40 Gb/sec, which is equivalent to an actual optical transmission system. Note that even for the optical monitoring device 200 shown in FIG. 4 an implementation was performed under the same conditions, and it was confirmed that the same result is obtained.

From the above, it was found that by arranging the photodiodes constituting the detecting portion in series or parallel, it is possible to apply a Mach-Zehnder-interferometer-type optical modulator to an optical modulator having a higher transmission rate, a matrix optical switch and the like.

This application is based upon and claims the benefit of priority from Japanese patent application No. 2014-067113, filed on Mar. 27, 2014, the disclosure of which is incorporated herein in its entirety by reference.

While the invention has been particularly shown and described with reference to exemplary embodiments thereof, the invention is not limited to these embodiments. It will be understood by those of ordinary skill in the art that various changes in form and details may be made therein without departing from the scope of the present invention as defined by the claims.

What is claimed is:

1. An output monitoring method for a Mach-Zehnder-interferometer-type optical modulator including first and second waveguides, the output monitoring method comprising:
   branching light from a light source at a branching portion into first and second lights;
   inputting the first light into a first end of the first waveguide, modulating a phase of the first light within the first waveguide, and then outputting the first light from a second end of the first waveguide;
   inputting the second light into a first end of the second waveguide, modulating a phase of the second light within the second waveguide, and then outputting the second light from a second end of the second waveguide;
   multiplexing at an optical coupler the first and second lights the phases of which have been modulated to generate interference light, and outputting the interference light from first and second output ports of the optical coupler;
   detecting at a detector a difference or ratio between a portion of the interference light from the first output port and a portion of the interference light from the second output port;
   setting an operating point of light based on the detected difference or ratio;
   controlling phase modulation of follow-on light that propagates through the first and second waveguides so as to keep the operating point constant; and
   preparing the optical modulator including, as first and second waveguides, a structure, the structure including:
   a first-conduction-type semiconductor layer that is provided on a substrate, and includes a waveguide including a rib structure, the rib structure projecting out in a direction away from the substrate;
   an insulator layer that is laminated on the first-conduction-type semiconductor layer; and
   a second-conduction-type semiconductor layer that is laminated on the insulator layer, wherein the waveguide including the rib structure is bonded with the second-conduction-type semiconductor layer via the insulator layer, and
   wherein a height of the rib structure from the substrate is equal to or more than W, and W is given by an equation:

$$W = 2\sqrt{\frac{\varepsilon_s kT \cdot \ln(N_c/n_i)}{e^2 N_c}},$$

wherein in the equation, $\varepsilon_s$ represents a dielectric constant of the first-conduction-type-semiconductor layer, k represents a Boltzmann constant, $N_c$ represents a carrier density, $n_i$ represents an intrinsic carrier concentration, e represents an amount of electric charge, and T represents a temperature.

2. The output monitoring method according to claim 1, wherein the detector includes two photodiodes, and the two photodiodes are connected in series and connect the first and second output ports of the optical coupler.

3. The output monitoring method according to claim 1, wherein the detector includes two photodiodes, and the two photodiodes are connected in parallel and are connected to the first and second output ports of the optical coupler, respectively.

4. The output monitoring method according to claim 1, wherein the first-conduction-type semiconductor layer, the insulator layer, and the second-conduction-type semiconductor layer are laminated on each other in order of the first-conduction-type semiconductor layer, the insulator layer, and the second-conduction-type semiconductor layer when seen in the direction away from the substrate.

5. An output monitoring device comprising:
   a light source that emits light;
   a branching portion that branches the light from the light source into first and second lights;
   a Mach-Zehnder-interferometer-type optical modulator that includes first and second waveguides, the first waveguide receiving the first light at a first end of the first waveguide, the first waveguide modulating a phase of the first light within the first waveguide, the first waveguide outputting the first light from a second end of the first waveguide, the second waveguide receiving the second light at a first end of the second waveguide, the second waveguide modulating a phase of the second light within the second waveguide, the second waveguide outputting the second light from a second end of the second waveguide;
   an optical coupler that multiplexes the first and second lights the phases of which have been modulated to generate interference light, and outputs the interference light from first and second output ports of the optical coupler; and
   a detector that detects a difference or ratio between a portion of the interference light from the first output port and a portion of the interference light from the second output port,
   wherein the optical modulator includes, as first and second waveguides, a structure, the structure including:
   a first-conduction-type semiconductor layer that is provided on a substrate, and includes a waveguide including a rib structure, the rib structure projecting out in a direction away from the substrate;
   an insulator layer that is laminated on the first-conduction-type semiconductor layer; and
   a second-conduction-type semiconductor layer that is laminated on the insulator layer, wherein the waveguide including the rib structure is bonded with the second-conduction-type semiconductor layer via the insulator layer, and
   wherein a height of the rib structure from the substrate is equal to or more than W, and W is given by an equation:

$$W = 2\sqrt{\frac{\varepsilon_s kT \cdot \ln(N_c/n_i)}{e^2 N_c}}$$

wherein in the equation, $\varepsilon_s$ represents a dielectric constant of the first-conduction-type-semiconductor layer, k represents a Boltzmann constant, $N_c$ represents a carrier density, $n_i$ represents an intrinsic carrier concentration, e represents an amount of electric charge, and T represents a temperature.

6. The output monitoring device according to claim 5, further comprising:
a mechanism that is connected to the second ends of the first and second waveguides, and corrects a coupling ratio of light in the optical coupler.

7. The output monitoring device according to claim 5, further comprising:
a test light source that is connected to the first ends of the first and second waveguides via the optical coupler, and emits light of a known mode to the first and second waveguides.

8. The output monitoring device according to claim 5, wherein the detector includes two photodiodes, and
the two photodiodes include an $Si_xGe_{1-x}$ layer or an InGaAs layer being laminated on an Si substrate.

9. The output monitoring device according to claim 5, wherein the first-conduction-type semiconductor layer, the insulator layer, and the second-conduction-type semiconductor layer are laminated on each other in order of the first-conduction-type semiconductor layer, the insulator layer, and the second-conduction-type semiconductor layer when seen in the direction away from the substrate.

* * * * *